Nov. 10, 1964     L. E. MILLER, JR     3,156,220
ROTARY INTERNAL COMBUSTION ENGINE Filed Aug. 22, 1960     9 Sheets-Sheet 1

Fig. 1.

INVENTOR.
LLOYD E. MILLER, JR.

BY
ATTORNEY.

Nov. 10, 1964    L. E. MILLER, JR    3,156,220
ROTARY INTERNAL COMBUSTION ENGINE
Filed Aug. 22, 1960    9 Sheets-Sheet 2

INVENTOR.
LLOYD E. MILLER, JR.
BY
ATTORNEY.

Nov. 10, 1964   L. E. MILLER, JR   3,156,220
ROTARY INTERNAL COMBUSTION ENGINE
Filed Aug. 22, 1960   9 Sheets-Sheet 9

Fig. 10

INVENTOR.
LLOYD E. MILLER, JR.
BY
Julian C. Renfro
ATTORNEY.

United States Patent Office 3,156,220
Patented Nov. 10, 1964

3,156,220
ROTARY INTERNAL COMBUSTION ENGINE
Lloyd E. Miller, Jr., Sunrise Cedars, Md.
(7811 Erwin Road, Coral Gables, Fla.)
Filed Aug. 22, 1960, Ser. No. 51,098
16 Claims. (Cl. 123—8)

This invention relates to a novel spherical rotary internal combustion engine, and more particularly to a highly improved configuration that can be also utilized as a fluid motor, compressor or the like, amounting to a new geometric principle necessitating no oscillating nor reciprocating parts but possessing high speed, high efficiency capabilities.

In the past, a number of spherical rotary internal combustion engines have been proposed but these have characteristically met with little success. Perhaps one important reason for this lack of success was the fact that such engines often embodied two, four, or more combustion chambers with accompanying porting problems and reduced resultant working volume. Sealing between the individual chambers became a formidable problem to which no practical solution has been suggested.

According to the present invention, a basic engine unit comprises a housing in which a generally spherical cavity is defined, in which cavity a rotor and nutator are rotatively disposed, the rotor and nutator each having a working surface thereon defining with the cavity walls a large single combustion chamber in which controlled combustion can take place. The rotor and nutator are relatedly movable, with means being provided for causing the nutator to undergo nutative motion during rotation, thereby causing the working surface of the nutator to move alternately toward and away from the working surface of the rotor, thereby defining a large swept volume and amounting to a combustion chamber whose volume changes considerably.

According to design principles, the rotor is disposed on a rotor shaft at an angle in the housing, which angle is the same as the angle of nutation of the nutator, thus enabling the rotor and nutator to rotate cooperatively within the housing.

A preferred manner for bringing about this nutative motion of the nutator involves the use of a crankshaft disposed at substantially the opposite side of the cavity from the rotor, but with the crankshaft axis not in alignment with the rotor axis. The included angle between the rotor shaft and crankshaft should be substantially more than 90° but less than 180°. A crankpin is disposed on the crankshaft at an angle thereto, with this angularity being directly relatable to the amount of angularity between the rotor and nutator axes. For example, if the crankpin is disposed at a thirty degree angle to the crankshaft axis, the rotor axis must be disposed thirty degrees away from an extension of the axis of the crankshaft.

The nutator is rotatively disposed upon the crankpin, with the arrangement being such that the crankpin is at all times perpendicular to the working surface of the nutator, or in other words, the axis of the crankpin is at all times coaxial with the principal axis of the nutator.

The orientation of the nutator during rotation is both a function of the crankpin position and the position of the rotor. The rotation of the crankshaft is such as to cause the nutator and rotor to rotate within the housing at a mean angular velocity of one-half crankshaft angular velocity. By virtue of the structure and the structural relationships involved, the rotation of the crankshaft is constantly bringing about substantial combustion volume changes, for in one crankshaft position the volume defined between the working faces of the rotor and nutator are quite substantial, whereas 360° away from this first position, the working faces of the rotor and nutator are brought into close relationship with greatly reduced volume therebetween. It should therefore be seen that a combustible mixture contained in the enlarged volume, when compressed to the small volume will be capable, when ignited by a suitably disposed spark plug in the housing wall, of producing a substantial working pressure that reacts against the face of the nutator, driving it away from the rotor and thus effecting rotation of the crankshaft and causing useful power to be delivered thereto.

This invention is not to be limited to the use of a crankshaft for bringing about the nutative action, however, for other embodiments of this invention comprehend the use of any of several means on the remote side of the nutator from the working surface thereof, for generating the proper nutational motion and for extracting power from the nutator during the combustion stroke.

Because the engine lends itself more simply to two-stroke cycling than four-stroke operation, two principal and distinct modes of two-stroke charging are hereinafter embodied. In the first system the volumetric change occuring in the engine crankcase is utilized to pump a pre-carbureted gas and air mixture through the engine's combustion chamber for scavenging and charging purposes wherein such a system is well suited to small engine applications in the 1–10 horsepower class. A second mode which is most applicable to larger engines requiring more enonomical operation, uses direct fuel injection in conjunction with a scavenging blower.

In both modes, however, straight scavenging is advantageously employed, with much simplicity, because of openings, located at each end of the combustion chamber, being readily ported and unported by the rotation of the rotor and nutator. Scavenging air from a blower or compressed mixture from the crankcase thus enters the combustion chamber from an inlet at one end to recharge as well as purge the chamber of spent gases of combustion, said gases leaving through an exhaust outlet at the opposite end of the chamber.

Other embodiments of this invention including ignition, carburetion, fuel injection, cooling and lubrication as well as several systems of rotor-nutator restraint will become apparent as the engine is set forth in more detail.

Basic engine units according to this invention can be advantageously employed for compound engine arrangements in which the output shafts of several engine units may be coupled to a common output shaft. Such compound engine arrangements include V, radial, in-line and opposed configurations.

It is firmly believed that this engine is the first rotary engine conceived or reduced to practice which utilizes two or three rotary, non-reciprocating, non-oscillating parts associated with full area-type sealing at all mating connections, as will be hereinafter described.

Other objects, features and advantages will be apparent from the enclosed drawings in which.

Figure 1:
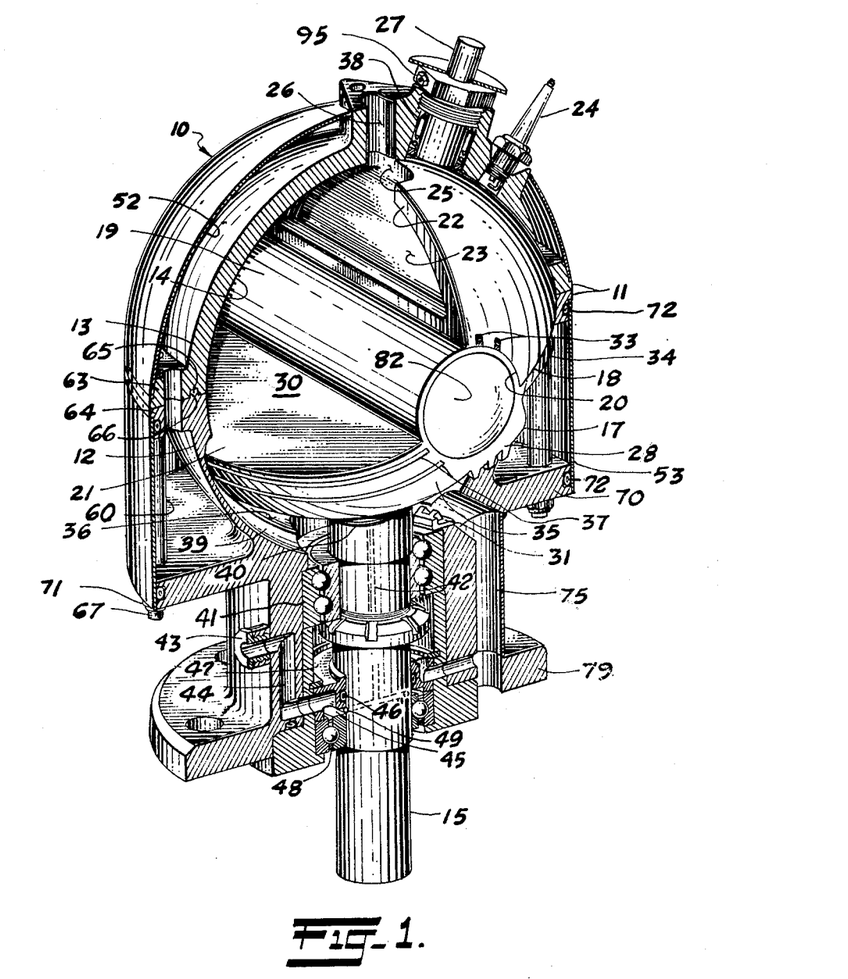
FIGURE 1 is a perspective illustration of a first engine embodiment according to this invention, with portions of the housing removed to reveal in the intake position the members defining the combustion chamber.

Referring to FIGURE 1, a basic engine unit 10 is there illustrated, comprising a housing 11 constituted by a lower housing member 12 and an upper housing member 13 tightly secured thereto. These members may be of semi-steel and generally in the shape of hemispheres, the sidewalls of which are internally configured to together form a spherical cavity 14. Crankshaft 15 preferably of steel is rotatably mounted in lower housing member 12, and as will be noted from FIGURE 3 and 8, an integral crankpin 16 is disposed on the crankshaft at an acute angle with respect to the axis of the crankshaft. Nutator 17, which may be in the configuration of a hemispherical frustum, is disposed in the housing so that a portion of its periphery is at all times in sliding yet gas-tight contact with the spherical cavity walls of the housing 11. Nutator 17 is rotatably disposed upon crankpin 16; and bearings, such as needle bearings contained in the nutator are responsible for providing a frictionless contact with the crankpin 16 so that the nutator can rotate and simultaneously nutate in the housing. The crankpin is hardened to prevent damage from the bearings, which may be similar to bearings 132 in FIGURE 8.

Rotor 18, whose geometric form is essentially that of a spherical wedge, is rotatably mounted in substantially the opposite end of the housing 11 from the crankshaft 15, but the rotor shaft 27 is disposed at an obtuse angle to the crankshaft. If the crankshaft axis is considered as extending upwardly through the upper housing member the rotor axis may then be thought of as being at an acute angle thereto. There is a definite relationship between crankpin angularity and the rotor axis angle, for as will be noted from FIGURE 4, there is a precise alignment between the two at certain rotative positions of the crankshaft. The crankpin and rotor axis may, for example, be disposed at a 30° angle to the extended axis of the crankshaft, although this angle is merely cited as exemplary, and I am not to be limited thereto.

Unlike the combined nutating and rotating motion of the nutator the rotor 18, mounted on rotor shaft 27, undertakes only rotary motion in the housing, also being configured to fit closely in sliding yet gas-tight contact with the cavity wall. Needle bearings 38 form an effective, low friction mounting for rotor shaft 27. The motion of the rotor is always coincident with the motion of the nutator by virtue of an interconnection between these members in the form of a center bar 19, preferably of cylindrical shape. This interconnection may be likened unto a hinge, which permits in one part of the cycle the nutator to approach the rotor, and in another part of the cycle to move away from the rotor.

I am not to be limited to a center bar of cylindrical configuration, inasmuch as a barrel-shaped, spool-shaped or stepped-shaped solid of circular cross section could be utilized if preferred. The center bar may be an integral part of the nutator, which mates closely with a generally concave surface 20 on the rotor, contoured to fit the center bar closely. A pair of seals 33 disposed on surface 20 bear against the center bar to provide a gas-tight fit between the nutator and rotor.

An alternate form of construction could involve the center bar being made a part of the rotor, with the hinge action taking place between the center bar and nutator. As should be obvious, in all instances, the concave surface mating with the center bar should be closely configured thereto.

The nutator and rotor may be made of aluminum alloy although any other suitable material may be substituted if desired. Because of the substantial amount of contact pressure between the center bar and the concave surface opposite it, the center bar should for example be of hardened steel, cast iron or steel that has been hard-chrome plated, these steps being taken to prevent any seizure tendency.

The motion of the nutator defines a comparatively large swept volume, or in other words, a substantial volumetric displacement. The combustion chamber 30 is thus seen to be in the shape of a spherical wedge, defined between the working faces 21 and 22 of the nutator and rotor, and a portion of the cavity sidewall that, during engine operation, is constantly changing. The large combustion chamber volume defined between the working faces of nutator and rotor in FIGURE 1 has been reduced to the substantially smaller volume shown in FIGURE 2 by the rotor and the nutator having rotated 180°. The motion of the nutator with respect to the rotor may be considered as a relative oscillating motion, but inasmuch as the rotor and the nutator are not rigidly joined, but rather independently supported by bearings 41 and 48 in the housing, there is no actual oscillating motion as such.

Figure 7A:
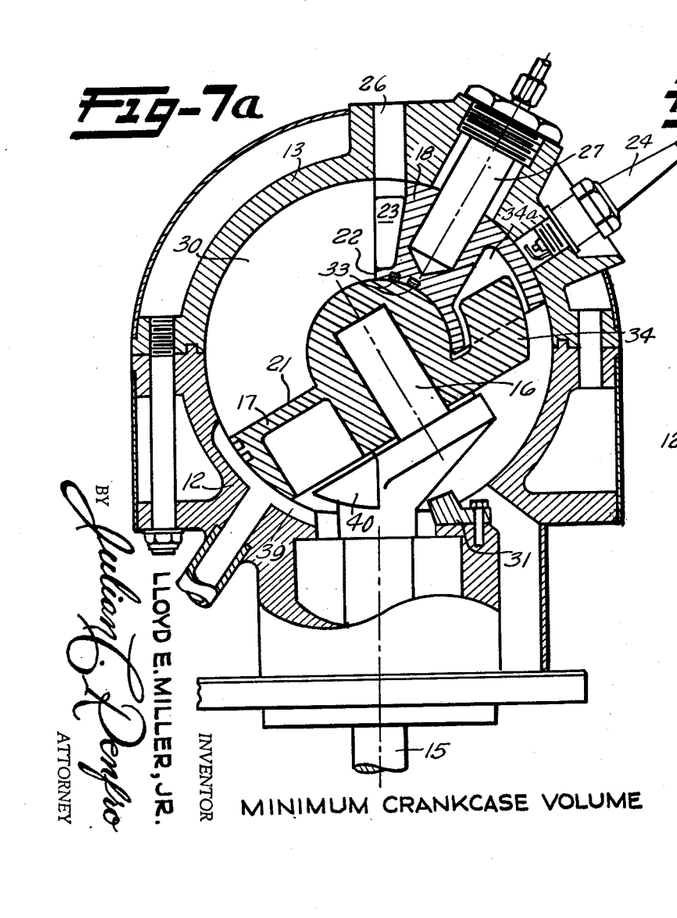
FIGURE 7a is a simplified view showing the relationships of rotor and nutator members during minimum crankcase volume.
Figure 7B:
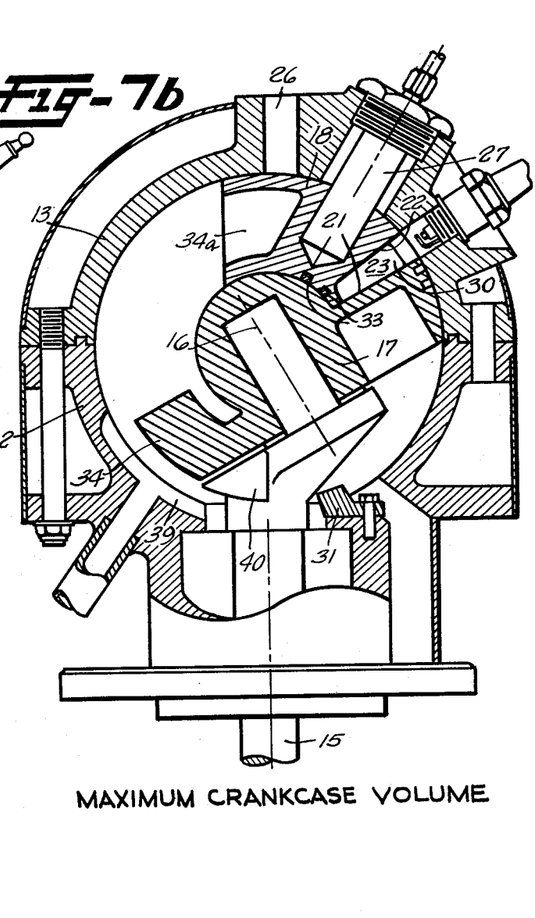
FIGURE 7b is a view like FIGURE 7a but revealing the members in the position of maximum crankcase volume.

Reference should be made to FIGURES 7a and 7b wherein it is illustrated in perhaps greater detail how the large combustion chamber volume shown in FIGURE 7a is made much smaller as a result of the rotation of crankshaft 15.

It should be noted that as the crankshaft 15 rotates, the crankpin 16 is at all times perpendicular to the working surface 21 of the nutator, or in other words, the axis of the crankpin is at all times during rotation coaxial with the principal axis of the nutator. The rotation of the crankshaft is such as to cause the nutator and rotor to rotate within the housing at a mean angular velocity of one-half crankshaft angular velocity.

Figures 2, 5:
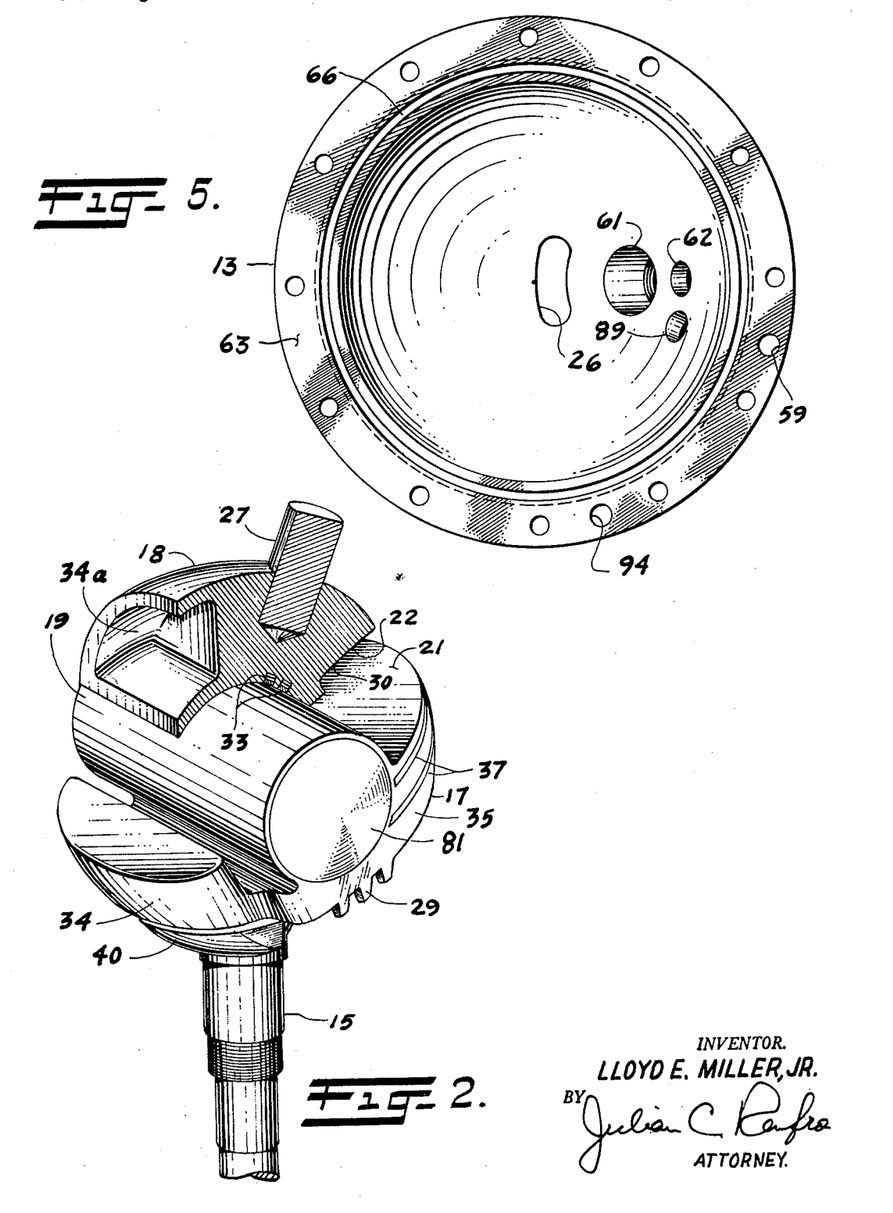
FIGURE 2 is a perspective view in which the active members are removed from the housing, and disposed in the position in which the combustion volume is smallest.
FIGURE 5 is a view of the underside of the upper housing.

The orientation of the nutator is both a function of the crankpin position and the position of the rotor. It may be seen from FIGURES 1 and 7a that the working face 21 of the nutator, in one position of the crankshaft, forms a substantial angle with the working face 22 of the rotor. However, after the crankshaft has rotated 360°, the working faces of the rotor and nutator are brought into close relationship as seen in FIGURES 2 and 7b, with a greatly reduced volume therebetween. This means that expanded chamber seen in FIGURE 1 has, upon rotating halfway around the housing, been reduced to a small volume with the resultant effect of compressing an air and gas charge contained therebetween. Therefore, a combustible mixture of gas and air contained within the chamber as defined by FIGURE 1, when compressed to the small volume shown in FIGURE 2 will be capable, when ignited, of producing a substantial working pressure. Accordingly, a spark plug 24 or the like is provided on the upper housing member 13 to ignite the highly compressed combustible mixture so that a working pressure will be created to react against the face of the nutator, to drive it away from the rotor thus effecting rotation of the crankshaft and causing useful power to be delivered thereto. I preferably employ a combustion pocket 23 in the working face of the rotor to provide the final volume to which the gas charge is compressed, thus determining the compression ratio. Said combustion pocket could equally well be a recess in the working face of the nutator or alternately a predetermined angular gap between rotor and nutator working faces.

With regard to the provision of a spark plug, it should be noted that the position of the spark plug 24 in the upper housing is such as to essentially coincide with the position of a passage 25 leading from combustion pocket 23 when the nutator has moved to a point closely adjacent the rotor as seen in FIGURE 2, thus permitting the spark plug to fire into the combustion chamber defined between the working surfaces of the nutator and rotor.

As to the exhausting of the products of combustion, an exhaust port 26 is provided in the upper housing at a location essentially diametrically opposite to the spark plug with regard to the rotor shaft 27 so that during a certain period of rotation of the rotor, namely when the combustion chamber 30 is at its largest volume, the relationship of passage 25 and port 26 is such that the exhaust products can escape therefrom. Port 26 is kidney-shaped, as will be observed in FIGURE 5, to permit exhausting to occur during a predetermined angle of rotation.

A counterbalance 34 is provided on the opposite side of the nutator from the skirt portion 35 to partially satisfy balance criteria. A further aspect of nutator balance requires that for vibration free operation the three principal moments of inertia, $I_{xx}$, $I_{yy}$, $I_{zz}$ of the nutator be equal. This is equivalent to letting the nutator have approximately the mass distribution of a solid sphere. Such is accomplished by machining the nutator for lightening purposes in certain areas and attaching high-density mass such as inert uranium-238 at other points within the nutator profile. Correspondingly, the rotor is balanced by the same system but requires only simple static and dynamic balance as compared to the nutator. The crankshaft is also balanced by the crankbalance 40 to offset the weight of the crankpin 16 and its associated crank arm.

The rings 37 on the skirt portion of the nutator are arranged to contact the chamber walls of the housing, and extend only approximately half-way around the nutator, being biased outwardly from the skirt by small expander springs or the like. The crankcase volume 36 of the engine may be regarded as extending up past the rear side of the nutator, and contacting the rotor on the side opposite its working surface 22.

The structure and structural relationships of the rotor and nutator offer an inherently simple valving and "straight scavenging" arrangement utilizing no poppet valves or the like, this scavenging scheme being readily possible because of a port opening located at each end of the combustion chamber. The inlet to the combustion chamber is formed by an inlet bypass 39 that is opened during the scavenging part of the engine's cycle by the skirt 35 of the nutator 17 as it passes through the position where the combustion chamber is of maximum volume. Note FIGURE 1, wherein this detail as well as the exhaust port 26 opened by rotor passage 25 are shown. As in the case of two-stroke reciprocating self-scavenged engines, the exhaust port is arranged to be opened a few degrees ahead of the opening of the inlet bypass, thus preventing premature ignition of the fresh charge of air and fuel.

The engine shown in FIGURE 1 lends itself to a self-scavenged embodiment in which movements of the nutator produce an increase and decrease in crankcase volume during each 360° rotation of the rotor and nutator wherein this sufficient volumetric change is utilized to pump a fresh charge of combustible mixture from the crankcase into the combustion chamber. The bypass 39 connects the combustion chamber with the crankcase 36, allowing the compressed crankcase gases to scavenge the working chamber defined between working surfaces 21 and 22 of nutator and rotor each time the nutator uncovers the bypass. Duct 75 is provided along the outside of the lower housing between flanges 70 and 79 to deliver properly carbureted air to crankcase 36 in this self-scavenged embodiment. As will be seen in more detail hereinafter, the duct 75 also may be employed as a crankcase breather duct for an embodiment utilizing an extrinsic blower for scavenging the combustion chamber.

Figure 4:
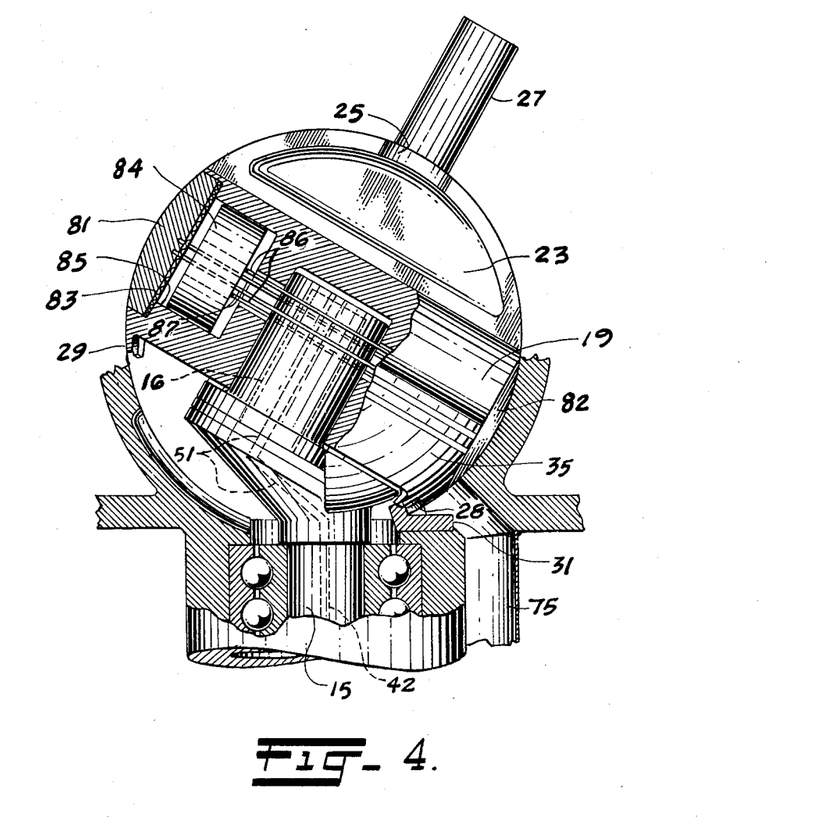
FIGURE 4 is a side elevational view revealing nutator teeth engaging the restraining gear, as well as certain internal constructional details.

When the crankshaft has rotated so that the axis of the crankpin 16 is coaxial with the axis of the rotor shaft 27 as shown in FIGURE 4, both the rotor and nutator are, so to speak, unrestrained, i.e., rotation of the rotor and nutator about this axis does not produce a displacement between the working elements. Accordingly, I propose several systems of restraint whereby any one of which may be embodied to control the motions of the rotor and nutator during this angular sector where no restraint is provided by the crankpin.

A first system for providing the required restraint utilizes several gear teeth milled or otherwise formed on opposite sides of the nutator skirt 35, or attached to the skirt at locations 180° apart in alignment with the axis of the center bar. Note nutator gear sector 28 shown in FIGURE 1 and nutator gear sector 29 shown in FIGURE 2. A fixed gear sector 31 having teeth of similar diametral pitch to gear sectors 28 and 29 is located in the lower housing, and disposed about the crankshaft so as to be engaged by the gear sectors 28 and 29 of the nutator during each complete rotation of rotor and nutator. Each sector of nutator teeth alternately mesh with the teeth of the fixed sector, thus providing controlled rotor-nutator motion during that part of the cycle where no restraint is provided by the crankpin. The gear sectors should be slightly elliptical to accommodate the small change in angular velocity which takes place, It should be noted that the teeth do not mesh with great impact because rotational restraint is still provided by the crankpin as the gear teeth begin to engage, and it is not until after the gear teeth subsequently disengage that the crankpin again assumes the responsibility for rotational restraint. Although I prefer to use a plurality of teeth for restraint, as illustrated, it is within the purview of this invention to use but a single upstanding tooth on the interior of the cavity, which meshes with a single tooth space on each side of the nutator skirt to provide restraint.

As the crankshaft rotates at constant angular velocity, a variation exists in the angular velocity of the rotor because of the inherent geometry of the design. As a result, the rotor moves at its lowest angular velocity during the point at which the rotor and the nutator are in the position shown in FIGURE 4 in which the restraining gear is engaged. The high speed portion of the rotor's travel occurs 90° away, when the nutator and rotor are in the relationship shown in either FIGURE 1 or FIGURE 2. For a 30° crankpin and 30° rotor shaft the velocity variation is less than 14%. Greater angles correspondingly produce greater velocity variations.

Since a positive variation or increase in rotor angular velocity is inversely related to the rate of change of volumetric displacement this feature is employed advantageously in valving whereby considerable intake and exhaust valve area may be sequentially ported and unported with only a small amount of displacement being consumed during valving.

The lubrication of the embodiment according to FIGURE 1 can be accomplished by the use of a fuel and oil mixture that not only lubricates the ball and needle bearings but also the inner walls of the housing by virtue of the "oil mist" created therein.

By changing the intake and ignition schemes, the embodiment according to FIGURE 1 can be converted to a diesel cycle, so it may be desirable to establish a pressure lubrication system in which a drilled crankshaft passage 42 is employed, and a fitting 43 on the lower housing is connected to an oil pump (not shown) which may be engine-driven or separately driven by another means. A drilled passage 44 interconnects fitting 43 with an oil pressure chamber 45 defined between an O-ring 46 in contact with the crankshaft and plate 47, and sealed lower bearing 48. A radially drilled hole 49 in the crankshaft carries the pressurized oil to the drilled passage 42 located in the center of the crankshaft. This passage then carries oil upwardly, and as shown in FIGURE 4, it connects with a passageway 51 drilled through the crank arm and crankpin in order to lubricate the needle bearings.

Figure 3:
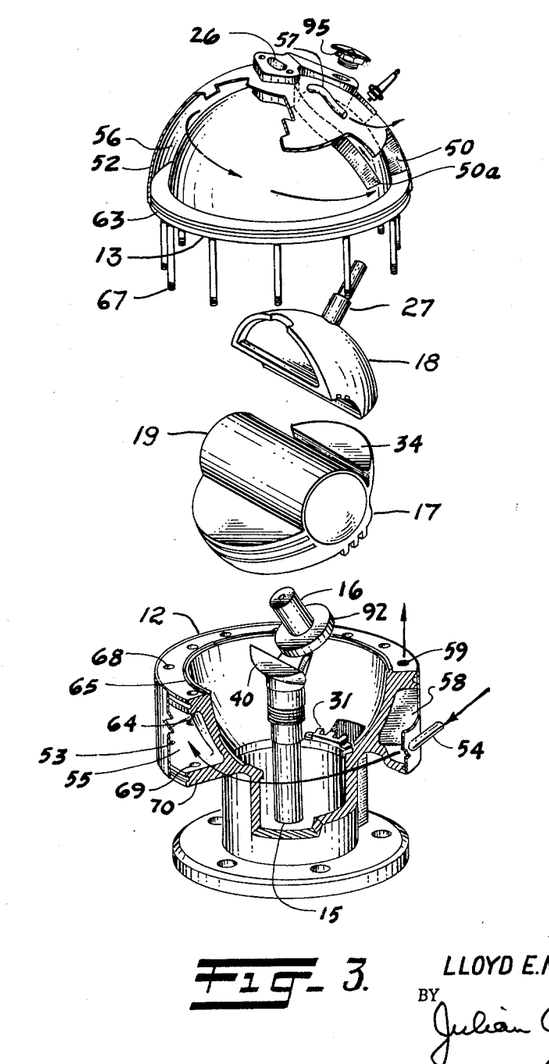
FIGURE 3 is an exploded view revealing additional details of the embodiment according to FIGURE 1.

As to other constructional details of the housing, the upper housing member 13 is provided with an encircling flange 63 which interfits closely with flange 64 of lower housing 12. As seen in FIGURES 1 and 3, one of the flanges, such as flange 64, is provided with an upstanding ring 65 whereas the opposite flange has a complementary groove 66 with which the ring interfits to provide the proper axial alignment between the housing halves. A series of bolts 67 or the like are disposed in spaced relation about the housing and which when tightened cause the flanges 63 and 64 to provide a high pressure gas-tight seal between the housing halves. These bolts are preferably affixed to flange 63 as will be noted in FIGURE 3, so as to in effect represent studs which extend through holes 68 in flange 64 when the housing halves are assembled together. These bolts or studs are of greater length than the flange thickness, however, and extend also through holes 69 located in lower flange member 70. These holes 69 are of course aligned with holes 68 of flange 64, and nuts 71 are employed on the threaded lower ends of the studs to draw the housing components tightly together. Hollow spacer member 60 extend between the flanges 64 and 70, through which members the bolts 67 extend. These spacer members are in fluid-tight relation with flanges 64 and 70 to prevent leakage of coolant from within the cooling jackets hereinafter described, and also have the additional advantage to prevent distortion of the lower housing when the bolts extending between the flanges 64 and 70 are tightened.

A water jacket arrangement is utilized to cool the housing, this being provided by an upper cooling jacket 52 of comparatively thin metal generally conforming to the hemispherical external contour of the upper housing, and a substantially cylindrically-shaped lower cooling jacket 53. The upper jacket is preferably welded to the upper housing and is in fluid-tight relation therewith, whereas the lower jacket may be removable, in which event O-rings 72 may be circumferentially disposed about the flanges 64 and 70 to provide proper sealing relation.

FIGURE 2, as previously mentioned, illustrates the relationship of the nutator and rotor when the combustion chamber is smallest, for these members have moved in the housing approximately 180° from the position shown in FIGURE 1. The crankshaft and crankpin however, are in the same rotative position in both FIGURE 1 and FIGURE 2, though the difference between the two views represents a complete 360° turn of the crankshaft, thus illustrating the two-to-one speed relationship of crank to rotor and nutator. This view also reveals counterweight recess 34a in the rotor to accommodate counterweight 34 when the nutator has moved to the position shown in FIGURE 1.

With the elements depicted in an exploded view as in FIGURE 3, the crankshaft 15 is disposed in the approximate position for bringing about the two positions of the nutator shown in FIGURES 1 and 2. FIGURE 3, in addition to illustrating in perhaps greater detail the members described in conjunction with FIGURES 1 and 2, also illustrates the crankshaft design, including the crank arm and crank counterbalance 40, as well as the crankin 16 and nutator thrust washer 92. The fixed restraining gear 31 is also illustrated in the lower housing. Certain aspects of the cooling system are also illustrated in FIGURE 3, which include the coolant inlet 54 to admit water to the interior 55 of the cooling jacket 53 of the lower housing, as well as outlet 57 in the upper housing. Baffle 58 adjacent to the tangentially-disposed inlet pipe 54 blocks the water flow from making more than one revolution around the lower housing, for it directs the water to flow upwardly through hole 59 in the flanges 63 and 64 and then enter the interior 56 of the jacket 52 of the upper housing. The water is caused to flow in the opposite rotative direction within the water jacket of the upper housing because of baffle 58, so the water flows counterclockwise, as indicated by arrows around the upper housing of FIGURE 3. The flow of water is prevented by the same baffle from making more than one revolution. The baffle 58a further directs the water to flow toward the highest point on the upper housing, at which point the water outlet 57 is located. Since the expansion portion of the engine cycle typically occurs on the near side of the upper housing for "standard rotation" (crankshaft rotation counter-clockwise as viewed from crankshaft end) as seen in FIGURE 3 the direction of engine rotation therefore dictates that the water outlet be located at this, the highest and hottest point in the engine.

Referring to FIGURE 4, it will be seen that the rotor and nutator have moved to a position approximately 90° away from the position shown in FIGURE 2, this being brought about by a one-half turn of the crankshaft so as to dispose the crankpin 16 in approximate alignment with the rotor shaft 27. This combined rotation and nutation of the nutator results in the skirt portion 35 of the nutator being disposed in a position extending across the juncture of the upper and lower housings.

When the crankpin and rotor shaft are in alignment as shown in FIGURE 4, the crankpin can no longer furnish the required restraint, as previously mentioned. The restraining gear teeth thus provided restrain the nutator during that portion of the rotation wherein no restraint is provided by the crankshaft as previously mentioned, it being understood that when the crankshaft has rotated so as to dispose the gear teeth on the opposite side of the nutator in engagement with the fixed gear teeth, the relationships of the principal elements shown in FIGURE 4 will be the same with of course the nutator counterweight and counterweight recess in the rotor being revealed instead of those elements appearing in FIGURE 4.

As shown in FIGURE 4, end caps 81 and 82 are located at the ends of center bar 19 in order to provide sealing, so that high pressure gases generated between the working faces of nutator and rotor do not escape across the ends of the center bar. Each end cap is closely fitted into a hollow portion at an end of the center bar and is biased outwardly, such as by a spring 83 into a close-fitting engagement with the spherical inner walls of the housing. A counterweight such as weight 84 is attached to each end cap with the weight in each instance being on the opposite side of the crankpin axis from its respective end cap. By virtue of this arrangement, centrifugal force acting upon the end caps is cancelled, leaving only the predetermined and constant spring force to act upon the end caps. Illustrated counterweight 84 is slidably disposed in a suitable recess 85 in the center bar 19, and is attached to its end cap 82 by a pair of short rods 86 which pass freely frough the opposite counterweight, not shown. Similarly, rods 87 connecting end cap 81 with its counterweight pass freely through weight 84. Each pair of rods are spaced to pass around the crankpin, and each pair of rods is offset with respect to the center bar axis to prevent interference between the two sets of rods.

In FIGURE 4, it is not intended that any valving action take place between the nutator and the inlet duct 75 leading from the carburetor to the crankcase, for despite the appearance that the nutator is blocking the duct, it is to be realized that the width of the duct is sufficient that the skirt of the nutator cannot block it.

In FIGURE 5, a view of a typical interior of an upper housing portion is illustrated in which the kidney-shaped exhaust port 26, hole 61 for rotor shaft, and tapped hole 62 for a spark plug are shown, with it being understood that the rotor shaft hole is approximately equidistant between spark plug and exhaust port inasmuch as the exhaust passage 25 of rotor 18 must substantially coincide with the exhaust port during the exhaust function and with the spark plug during ignition. A threaded fuel injector hole 89 adjacent the spark plug hole is also shown in this figure, the function of which will be later explained. Oil return hole 94 in FIGURE 5 serves to conduct the return flow of lubricating oil from the rotor shaft needle bearing 38, the supply of oil to this bearing having been supplied by an external oil supply line which enters an oil fitting 95 as shown in FIGURE 1. (See oil fitting 195 in FIGURE 8). The return flow of oil is thereafter led through a tube (not shown) extending within the water jackets of both housings, into the duct 75 and ultimately into an oil sump of the general type shown in FIGURE 9.

Figure 6:
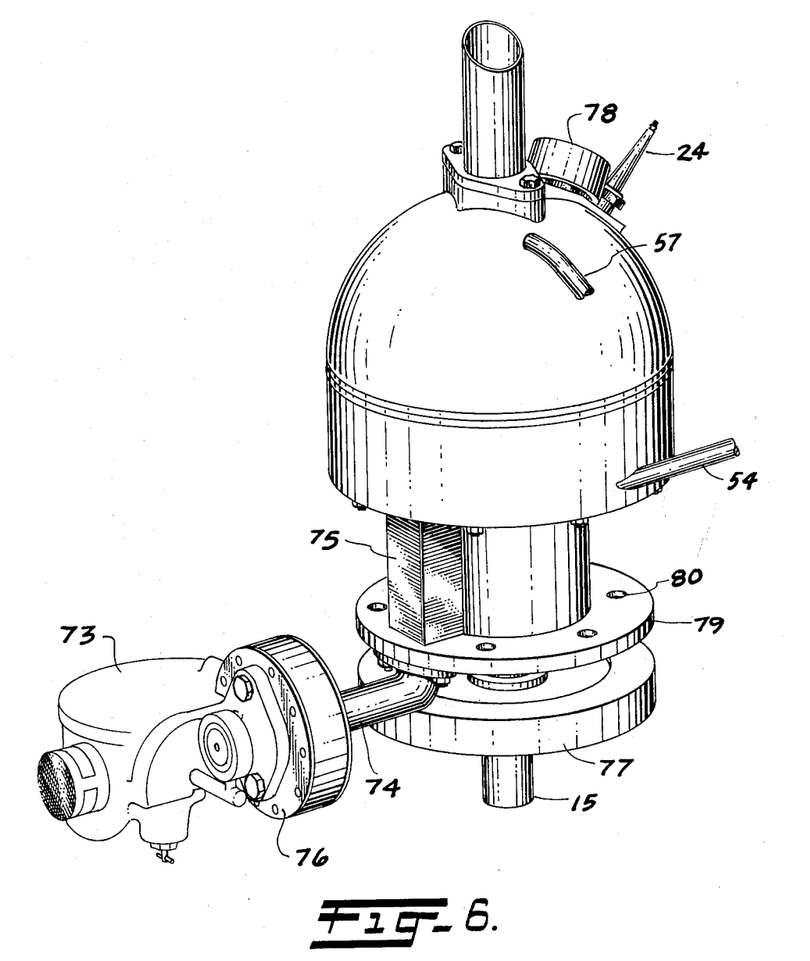
FIGURE 6 is an assembly view revealing carburetion, cooling and ignition details of a self-scavenged engine.
Figure 9:
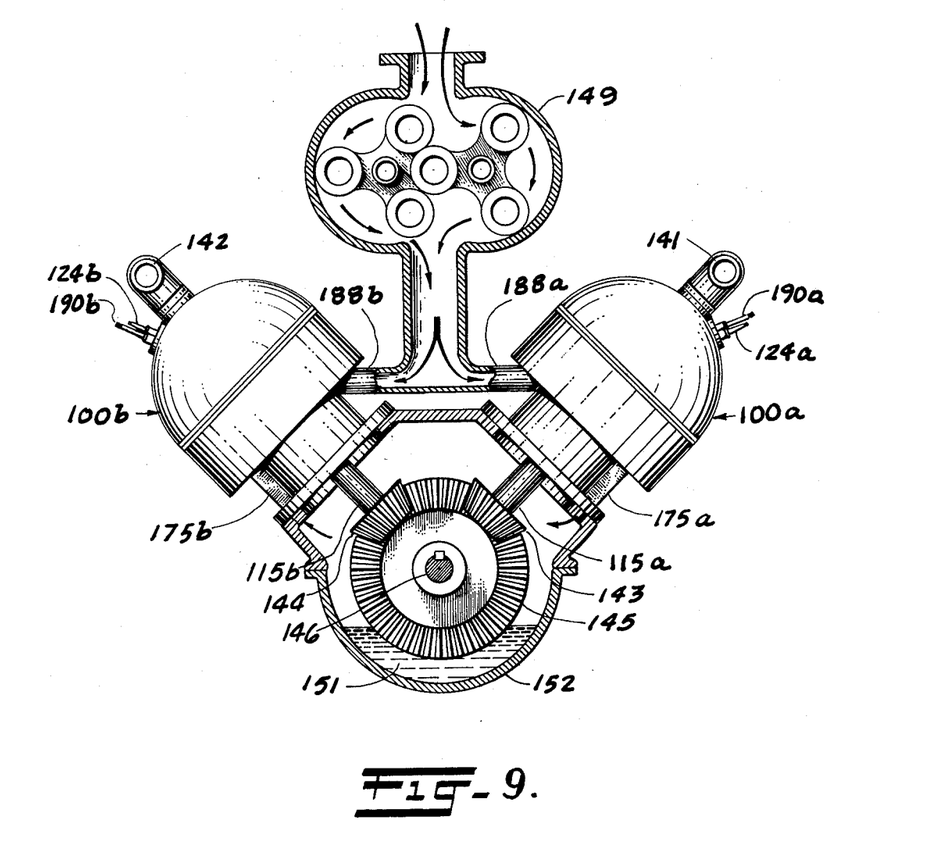
FIGURE 9 is a compound engine arrangement utilizing a pair of basic engine units disposed in a V-configuration.

Referring now to FIGURE 6, a typical two-stroke self-scavenged embodiment is shown, which represents a configuration adapted for small power requirements such as outboard motors, lawn mowers, chain saws and the like, where a single engine unit would be employed with the crankshaft directly coupled to the load. This embodiment utilizes a carburetor 73 which is connected by an intake manifold 74 with the duct 75 opening into the crankcase 36, such related components providing an induction means for supplying the said engine with a gas and air mixture. Though the duct 75 is shown as being located approximatley opposite the rotor shaft side of the engine in FIGURE 6 for purposes of illustration, its orientation about the periphery of the engine with respect to, say the rotor shaft is of no consequence in this embodiment. However in the V-engine, as shown in FIGURE 9, the location of the very similar breather ducts 175a and 175b assume more significance by serving as oil drains from a low point in the spherical cavities to the oil sump below, as will become more apparent. Intermediate the carburetor and the duct 75 is a valve assembly 76 for preventing a reverse flow of fuel and air mixture from tending to take place thru the intake manifold and carburetor. A reed valve is admirably suited for this purpose. A flywheel 77 mounted on the crankshaft may be utilized to provide uniform angular momentum, thus insuring the smooth delivery of power.

Also shown in FIGURE 6 is a typical electrical ignition arrangement such as may be employed by all embodiments of this invention not operating by compression ignition. The timing assembly 78 may employ a single-lobe cam arranged to turn with the rotor shaft 27. Ignition points are mounted adjacent the cam and have thereon a cam follower arranged to follow the active surfaces of the cam, thereby to move the electrically conductive portions into and out of engagement to bring about energization of the spark plug 24 at the proper moment to provide ignition in the combustion chamber.

Engine mounting flange 79 is provided about the base of the engine according to FIGURE 6, about the circumference of which a number of mounting holes 80 are located, which for example may be six in number.

As an example of the operation of this embodiment, and as revealed by a comparison of the positions of the members in FIGURE 7a and 7b, as the nutator moves relatively upward to compress a charge of gas and air between the working faces of the nutator and rotor, the crankcase volume is contemporaneously increasing, causing ambient air to flow into the carburetor. The carburetor serves the function of mixing the proper proportion of fuel with the air, which mixture is then drawn through the reed valve into the crankcase. By the time the nutator has rotated to such an extent as to reach its most upward point of travel and started downwardly, the reed valve has closed and the crankcase pressure is caused to increase, such as to a pressure of 4 or 5 p.s.i. As the nutator rotates still further, it uncovers inlet 39, thus allowing the charge of combustible mixture pressurized in the crankcase to flow into the combustion chamber, purging same, and driving the spent exhaust gases upwardly and out through the now uncovered exhaust port 26. As the rotor and nutator rotate still further, the port 26 as well as the inlet 39 are closed, thus trapping inside the combustion chamber a combustible mixture to be compressed by the next relatively upward movement of the nutator. The spark plug 24 is timed to ignite the mixture at the proper moment, with the resultant pressure increase acting as a force upon the nutator working face, driving it rotatively as well as relatively downward into the position in which it again uncovers the inlet 39 to admit the next charge of fuel and air, at the same time causing useful power to be delivered to the crankshaft.

Figure 8:
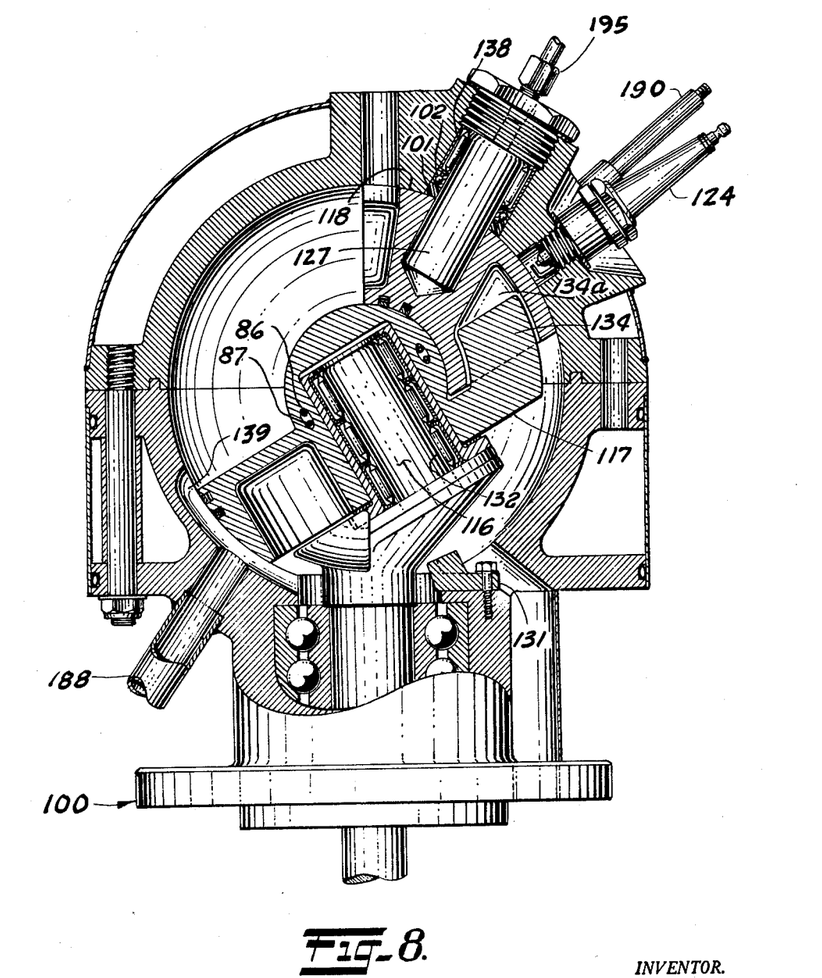
FIGURE 8 is a view of an embodiment that utilizes fuel injection and an extrinsic blower for scavenging.

Turning now to FIGURE 8, a second embodiment of this invention is revealed, which does not employ the self-scavenging feature described hereinbefore. Rather an extrinsic blower (not shown) is employed for supplying compressed air to the engine for scavenging and supercharging purposes, this compressed air being supplied through pipe 188 which connects into inlet passage 139 of this embodiment. No attempt is made to carburate this compressed air, principally for economy reasons, for if gas were mixed with the air, some would be lost through the exhaust during scavenging. The more economical system employed herein utilizes a fuel injector 190 disposed adjacent the spark plug 124 to inject fuel into the combustion chamber defined by the working surfaces of the rotor 118 and nutator 117 and the housing sidewalls. The fuel injector is located approximately the same distance from the rotor shaft 127 as the spark plug, but in FIGURE 8 is located behind the spark plug, thus to be in a position to inject fuel into the highly compressed air of the combustion chamber an instant before the spark plug fires. FIGURE 5, the inside view of the upper housing further shows tapped hole 89 representing the preferred injector location. As also revealed by FIGURE 8, the rotor 118 has a recess 134a on the side opposite its working surface in order to receive nutator counterweight 134, thus to prevent a collision between rotor and nutator counterweight, as previously mentioned.

As also seen in FIGURE 8, a seal 101 such as of Teflon surrounding the rotor shaft 127 in contact with both the housing wall and spherical rotor surface prevents high temperature combustion gas from leaking into the needle bearings 138. An O-ring 102 such as of neoprene between the Teflon seal and the needle bearings prevents pressurized oil supplied by oil fitting 195 from being lost uncontrollably into the combustion chamber, although an anticipated amount of leakage through the two seals provides lubrication for the spherical surface of the rotor augmenting the splash lubrication derived from the crankcase.

Referring to FIGURE 9 an engine arrangement is illustrated in which a pair of basic engine units, identical to the type shown in FIGURE 8, are disposed in a V-configuration with their crankshafts 115a and 115b geared by the use of bevel pinions 143 and 144 to the bevel gear 145 driving the engine's main output shaft 146. Since this particular engine embodiment like FIGURE 8, incorporates direct fuel injection into the combustion chambers and extrinsic blower scavenging, fuel injectors 190a and 190b are shown therein as well as a rootes blower 149 connected to the air inlets 188a and 188b of the engine units. Though spark plugs 124a and 124b are shown in the drawing, being located adjacent the injectors, their inclusion may be dictated by the type of fuel burned and the compression ratio selected. For most gasoline where compression ratios in the range of 8:1 would be used spark plugs would be employed, whereas diesel oils which require compression ratios of 16–20:1 could do without spark ignition and instead utilize glow plugs at the former spark plug locations.

An engine configuration according to this embodiment employing a bevel gear drive system of high mechanical efficiency (approximately 99% per unit) for multiple ganging of basic engine units is not only compact, having an overall configuration similar to but somewhat smaller than compound reciprocating engines, advantageously provides simplified removal of any one basic engine unit for servicing or replacement without disassembling the entire engine, as is generally the case for reciprocating engines.

It should be borne in mind that the V-arrangement of FIGURE 9 may include any number of units in tandem to comprise V-4, V-6 or V-8 combinations as well as in-line, radial and opposed configurations. Common exhaust manifolds 141 and 142 may be constructed to pass across the exhaust ports of the tandem units.

A single flywheel, not shown in FIGURE 9, disposed upon the output shaft serves all engine units in the group. Accessories which may be driven off the main output shaft, but not shown, include the injector pump, ignition distributor, generator, starter, water pump, oil pump, scavenging blower, cooling fan, etc.

When a scavenging blower is used on a multi-unit engine as in FIGURE 9 it will be noted that the purging air not only scavenges the combustion chambers of burnt gases but also imposes a supercharging effect to raise the initial pressure in the combustion chambers to the delivery pressure of the blower. Such may be accomplished by allowing the exhaust ports to be closed by the rotors of the units slightly ahead of the inlet bypasses being closed by the nutators. It should also be noted that when the nutator skirts are in the relatively upward positions as is the case during compression and combustion the inlet bypasses inherently allow the crankcases of the units and the gearcase 152, which is common thereto, to become charged to the delivery pressure of the blower. This has the advantageous effect of allowing the gear case to act as a surge chamber or pneumatic accumulator thereby storing air and supplying it more uniformly to the combustion chambers thru the ducts 175a and 175b as required. The ducts 175a and 175b further serve as breather passages to allow the air displaced by a decrease in crankcase volume of one engine unit to be exchanged with an expanding crankcase volume of an adjacent engine unit, thru the gear case as may be seen. Still another function of the ducts is to carry lubricating oil swept from the cavity walls by the rotors and nutators into the gear case oil sump 151 whereby such a sump allows an oil pump, not shown, to pick up the oil for recirculation to oil lubrication fittings on the engine as previously described. The oil sump additionally provides direct lubrication for all of the bevel gears and pinions as well as main shaft bearings in the gearcase. Since the gearcase is charged to the delivery pressure of the blower it therefore must be sealed around shafts and at mating flanges to withstand approximately 1½ atmospheres of pressure.

It should be noted that the engine embodiments employing two or more basic engine units according to this invention may utilize castings common to the several units. For example, the lower housings of the units constituting a V-configuration engine may be created in a common casting, and in in-line units for example, the upper housings of the several basic engine units may be made from a common casting. For utilizations such as for outboard motors, where compactness is quite important, the use of common housings for the several basic engine units is particularly desirable.

Figure 10:
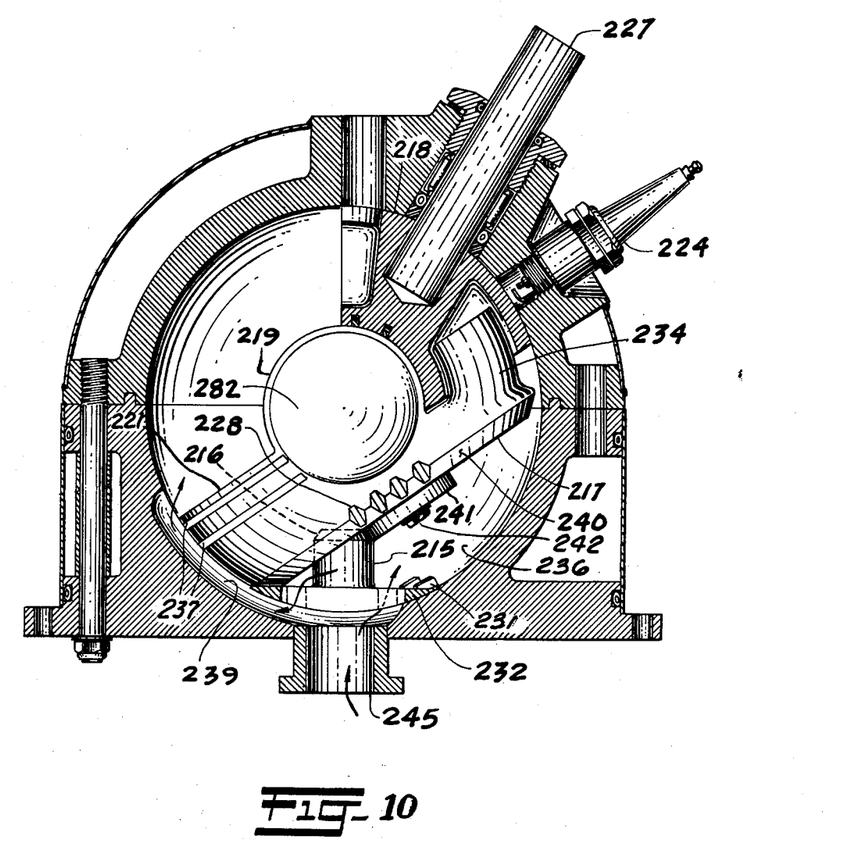
FIGURE 10 is an embodiment utilizing no crankshaft.

This invention is not limited to embodiments in which a crankshaft is employed, for as seen in FIGURE 10, an engine according to this invention can consist of but two moving parts, a rotor 218 and a nutator 217. As in the previous embodiments, rotor 218 is rotatively disposed in the housing with its rotor shaft 227 disposed at an acute angle to the principal axis of the engine, but the crankshaft has here been replaced by a central upstanding member 215 located on the principal axis of the engine in the lower central portion of the housing. Member 215 has a chamfered edge or track 216 disposed about its upper periphery, the member 215 according to the illustrated embodiment being fixed in the housing, with the arrangement being such that a roller 241 on the underside of the nutator, described in more detail hereinafter, can roll about the track 216 during rotation of the nutator. Alternatively, the proper friction-free contact between member 215 and the nutator can be obtained by having the member 215 rotatably mounted in the housing.

A hardened chamfered edge 240 is disposed about the periphery of nutator 217, which moves in rolling contact with a fixed circular track 232 of hardened metal disposed about and spaced from the fixed member 215. The roller 241 may be in the nature of a ball bearing, is secured such as by a bolt 242 to the central portion of the underside of the nutator, and this roller is arranged to roll about the chamfered edge 216 on the member 215.

For the sake of simplicity of illustration, FIGURE 10 shows the nutator chamfered edge 240 and the outer track 232 to be of circular construction. Since the velocity variation of the nutator with respect to the housing would produce a slight shearing or sliding action between the two surfaces, a preferred arrangement, not shown, utilizes an elliptical surface 240 engaging with the fixed circular eccentric track 232 to provide only pure rolling contact between the said surfaces. An alternate embodiment employs a circular edge 240 engaging with a rotatably mounted track 232 to eliminate any shearing action arising from the velocity variation, thusly providing only rolling contact.

As a result of the governing action of the inner and outer tracks, the axis of the nutator is only permitted to generate a hyperboloid, i.e., a double cone with apices touching. This motion is identical to the motion allowed by the crankshaft.

The system of restraint used herein, employing gear sectors, is identical to the system of restraint used in the crankshaft embodiment. As seen in FIGURE 10, gear sector 228 is employed on one side of the nutator skirt opposite a second gear sector, not shown, and these two sectors alternately mesh with fixed gear sector 231 during engine operation. Since no crankshaft is utilized in this embodiment, the force applied to the working face 221 of the nutator causes the nutator to experience the combined rotational as well as nutational type of movement as in the crankshaft type engine. The resultant torque on the nutator is transmitted to the rotor through the center bar hinge 219 and thus to the rotor shaft 227 where power is taken off. Such an arrangement as shown in this figure provides a simplified type of engine utilizing the self-scavenging arrangement described at length hereinbefore, in which combustible mixture entering crankcase 236 from inlet 245 enters the combustion chamber each time the nutator skirt dips below inlet bypass 239. However, if desired a fuel injection system with an extrinsic blower may be employed instead.

This invention is not to be restricted to the use of a crankshaft for extracting power from the nutator or for generating the nutational motion required by the nutator, nor is it to be limited to the crankshaftless version as shown in FIGURE 10.

Yet still another variation according to this invention involves the substitution of a gearshaft in place of the crankshaft wherein a circular bevel gear attached eccentrically to the end of said gearshaft is disposed within the spherical cavity so as to engage in meshing contact with an internal elliptical bevel gear milled into or otherwise rigidly affixed to the underside of the nutator. A track and roller system substantially identical to that shown in FIGURE 10 is incorporated into this embodiment with the exception that the fixed upright member 215 in FIGURE 9 is eliminated and the track surface 216 is now a machined chamfered edge on the end of the gearshaft, but in close proximity to the aforesaid circular bevel gear, and being on the side of said gear toward the nutator. A ball bearing-like roller disposed centrally on the underside of the nutator, identically configured and located as the roller 241 in FIGURE 10, is in rolling contact with the said chamfered edge of the shaft end. Rotation of the gearshaft thus causes the eccentric bevel gear on the end of the gearshaft to drive the elliptical bevel gear and therefore the nutator to which the said elliptical gear is an integral part thereof at a mean angular velocity which is one-half that angular velocity of the gearshaft. It should be obvious that the combination of elliptical gear engaging with the eccentric circular gear provides the velocity variation as required by the rotor and nutator, whereas the roller and track arrangement restricts the axis of the nutator to only a nutational path. Conversely, power applied to the nutator as a result of combustion occurring in the combustion chamber causes the nutator to both nutate as well as rotate, wherein such rotation causes the gearshaft to rotate and thereby deliver useful power. The charging means, including scavenging and other variations of ignition and carburetion or fuel injection may be typical of the other engines herein embodied.

It should be also obvious that the gear sector method of restraint set forth in the early embodiments of this invention could be enlarged upon, if preferred, to include full gears rather than gear sectors, wherein their configurations would be identical to the gears described in the preceding paragraph with the exception that the circular eccentric bevel gear would now be fixed and annularly disposed about the crankshaft or fixed upright member.

Also within the scope of this invention is an alternate form of rotor and nutator restraint wherein a compound engine employing two or more basic engine units would have the rotor shafts of two adjacent engine units geared together by means of elliptical gears. Such an arrangement would eliminate the need for internal restraining gears as previously embodied, by operating the adjacent rotors 90° out of phase with one another. In such a system both engine units would never be simultaneously in the crank-unrestrained position, thus restraint for an unrestrained engine unit would be provided by the restrained unit through the elliptical gearing coupling the rotor shafts. It is understood, of course, that the elliptical shape of the gears is required to provide the velocity variation which exists between two basic engine units with rotors 90° out of phase, whereas it would not be possible to couple the rotor shafts directly because of this speed variation.

For all of the engine versions within the scope of this invention a 30° angle of nutation or 30° rotor shaft offset effects an approximate 14% rotor-nutator velocity variation. More specifically, 10° of crankshaft rotation will provide a mean angular displacement of the rotor of 5°, a minimum annular displacement of slightly more than 4°, occurring during that part of the rotation where gear restraint is required, and a maximum displacement of less than 6° occurring 90° away from the aforesaid position. Even so, this variation is small in view of the 100% speed variation present in the reciprocating parts of ordinary piston engines.

Though all of the principal drawings included herein show the engine as being liquid-cooled it should be noted that the engine can also be constructed as an air-cooled version wherein the water jacket is replaced by cooling fins to dissipate heat.

Other applications for the invention must include use as a steam engine, fluid motor, pump, air compressor, etc., whereby appropriate valving may be applied thereto. The use of a hollow rotor shaft is especially desirable for such configurations, readily allowing fluid to flow to or from the working chamber during rotation. A hollow rotor shaft lends itself even further to the invention if it is preferred than an engine be constructed to operate on the four-stroke cycle, wherein intake and exhaust gases may be respectively admitted to and discharged from the combustion chamber by a single cam-operated poppet valve disposed coaxially within the hollow shaft.

In conclusion, undoubtedly a most significant advantage of this invention over many preceding types of rotary engines, particularly the vane types or trochoidal rotor types employing inadequate line-contact sealing to separate high and low pressure chambers, is the uniqueness of this geometric principle which permits the marriage of area-type sealing to a rotary engine utilizing no oscillatory or reciprocating elements. Area-type sealing is defined as a sealing means in which the working element is in considerable area-contact with a housing wall or adjacent element. Such is the case in this invention where gases of high pressure are generated within the combustion chamber and prevented from leaking to the low-pressure crankcase side of the engine by long devious paths over areas where much surface is in contact with adjacent surface, sealing being further improved by a capillary oil film adhering therebetween. Area-type sealing promotes long, seizure-free life for the working elements as well as the housing wall.

I claim:

1. A rotary displacement device of the class described comprising a housing, an interconnected rotor and nutator rotatively disposed in said housing and having working surfaces thereon, said working surfaces defining with an inner portion of said housing a chamber, said nutator undergoing nutative motion in said housing during rotation, thereby to bring about substantial volume changes in said chamber, means for providing fluid access to said chamber during a portion of the nutator movement, the fluid admitted being compressed by subsequent movement of the working surface of said nutator toward the working surface of said rotor, a center bar forming the interconnection between said members and being integral with one of said members, sealing means disposed on the other of said members and biased into close contact with the said center bar to prevent the leakage of high pressure fluid between said members, an end cap disposed at each end of said center bar to further prevent leakage, spring means for biasing said end caps radially outwardly, and centrifugal compensating means associated with each end cap to cancel the effect of centrifugal force upon said end caps, thereby to allow said spring means to determine the pressure with which said end caps contact the inner portion of said housing, and sealing means on said nutator disposed about a portion of the nutator contacting an inner portion of the housing, said sealing means extending substantially circumferentially from end cap to end cap and biased into contact with said inner portion of said housing by spring means.

2. A rotary internal combustion engine comprising a housing, said housing having a wall defining a generally spherical cavity, a pair of rotatable members closely fitted in said cavity and interconnected so as to rotate together, one of said members being a nutator arranged to nutate during rotation, a working surface on each of said members, the working surface of said one member being arranged to closely approach and then move away from the working surface of the other of said members as said members rotate in said housing, said working surfaces defining with said wall of said housing a combustion chamber whose volume changes appreciably as said working surface move in rotation about said housing, scavenging means including means for admitting a charge of combustible mixture into said combustion chamber to be combusted therein, said charge being compressed as a result of the working surface of said one member moving toward the working surface of said other member, said one member being driven away from said other member by the combustion of said charge taking place in said combustion chamber, rotary means driven by said one member for delivering useful rotative power, said one member being nutatively disposed about a gearshaft, said gearshaft having an axis of rotation at an angle to the axis of rotation of said other member, a circular bevel gear disposed in said cavity and attached eccentrically to said gearshaft, an internal elliptical bevel bear disposed on said one member on the side opposite its working surface and meshing with said circular bevel gear, said gearshaft providing rotary means for delivering power, and track means for assuring nutational motion of said one member.

3. A rotary internal combustion engine utilizing no oscillatory parts comprising a housing, said housing having a wall defining a generally spherical cavity, a pair of rotatable members disposed in substantially opposite portions of said housing, each of said members having a spherical portion in close contact with said spherically-shaped wall, and having a working surface, one of said members being a nutator rotatably mounted upon the crankpin of a crankshaft, said crankshaft being rotatably disposed in said wall, the other of said members being a rotor hinged to said nutator and having an axis of rotation disposed considerably more than 90° away from the crankshaft axis, but less than 180° away therefrom, said crankpin being disposed at an angle to the axis of said crankshaft equal to the acute angle the axis of rotation of said rotor bears to the extended crankshaft axis, whereby as said crankshaft rotates, the angularity of said crankpin with respect to the axis of said crankshaft causes the nutator to undertake nutative motion during rotation with said rotor, the working surface of said nutator being caused to move toward and away from the working surface of said rotor during such rotation, said working surfaces defining with said wall of said housing a combustion chamber whose volume changes appreciably as said working surfaces move in rotation about said housing, scavenging means, including means for admitting a charge of combustible mixture into said combustion chamber to be combusted therein, said charge being compressed as a result of the working surface of said nutator moving toward the working surface of said rotor, said nutator being driven away from said rotor by the combustion of said charge, thereby to supply useful power at said crankshaft, and restraining means for preventing, during alignment of said crankpin with said axis of rotation of said rotor, unrestrained rotation of said members without volumetric change in said combustion chamber.

4. The engine as defined in claim 3 in which said pair of rotatable members are hinged together by a center bar integral with one of said members, the other of said members having an elongated cavity thereon closely configured to said center bar, and elongated sealing members disposed in said elongated cavity and arranged to bear against said center bar for assuring a pressure-tight relationship during relative motion between said rotatable members.

5. The engine as defined in claim 4 in which said center bar is equipped with an end cap at each end, in contact with said spherical cavity wall, spring means biasing said end caps outwardly, and centrifugal compensating means associated with each end cap to cancel the effect of centrifugal force upon said end caps, thereby to allow said spring means to determine the pressure with which said end caps contact the inner portion of said cavity wall.

6. The rotary combustion engine as defined in claim 3 in which said restraint means comprises at least one tooth disposed on opposite edges of said nutator, said teeth being in substantial alignment with the axis of the hinge interconnnection between said rotatable members, fixed means in said housing alternately engaged by said teeth during engine rotation, said fixed means being engaged from a period just before alignment of crankpin and rotor axis, until a period just after such alignment point has passed.

7. A rotary internal combustion engine comprising a housing, said housing having a wall defining a generally spherical cavity in said housing, a crankshaft rotatably mounted in said housing, the axis of said crankshaft if extended passing through the center of said spherical cavity, said crankshaft having a crankpin thereon bearing an acute angle to said crankshaft, the axis of said crankpin passing through said center of said cavity, a nutator rotatably disposed in gas-tight contact with the wall of said cavity and mounted upon said crankpin, being caused to nutate with respect to said housing as said crankshaft rotates, due to the angularity imposed by said crankpin, a rotor rotatably mounted in gas-tight contact in a substantially opposite portion of said housing from said crankshaft and having an axis that if extended would pass through said center of said cavity at an obtuse angle with respect to the axis of said crankshaft, a hinge connecting said nutator and said rotor for causing concomitant rotation of said nutator and rotor, said nutator and rotor each having a working surface thereon, the working surface of said nutator being caused to move toward and away from the working surface of said rotor during rotation, due to the nutating movement of said nutator, said working surfaces defining with said wall of said housing a combustion chamber whose volume changes appreciably during each complete rotation of said nutator and said rotor in said housing, an inlet port controlled by said nutator for admitting a charge of combustible mixture into said combustion chamber, the working surface of said nutator moving toward said working surface of said rotor causing the charge to be compressed prior to combustion, and after combustion, said nutator being driven in the receding direction, thereby to supply power to said crankshaft, and outlet means controlled by said rotor through which products of combustion are expelled.

8. An engine arrangement comprising at least two rotary internal combustion engine units disposed in adjacent operative relationship, each engine unit including a housing defining a generally spherical cavity, and a pair of rotatable members closely fitted in said cavity and interconnnected so as to rotate together, one of said members in each engine unit being arranged to nutate during rotation, a working surface disposed on each of said members, the working surface on said one member being arranged to closely approach and then move away from the working surface of the other of said members as said members rotate in each said housing, said working surfaces defining with a portion of the respective housing a combustion chamber in said cavity whose volume changes appreciably as said working surfaces move in rotation about said housing, means in each of said housings defining an axis about which said nutator nutates, said other member in each housing having an axis of rotation disposed at an angle to the axis of nutation, and means providing restraint for said rotatable members of each engine unit against undesirable rotative movement in said housing during the interval in which the axis of nutation substantially coincides with the axis of rotation of said other member, said means providing restraint including means for coupling said engine units in staggered relation so that while the latter axes of one engine unit are in coincidence, the other engine unit is providing restraint for both units.

9. A rotary device of the class described comprising a housing, said housing having a wall defining a generally spherical cavity in said housing, a pair of rotatable members closely fitted in said cavity and interconnected so as to rotate together, one of said members being a nutator arranged to nutate during rotation with the other of said members, said nutator having a principal axis which likewise nutates during rotation of said nutator, said nutator axis being in alignment with the axis of the other of said members only during certain rotative positions of said members, each of said members having thereon a working surface, said working surfaces defining with said wall of said housing a combustion chamber whose volume changes appreciably as said nutator relatively oscillates with respect to the other of said members during rotation of said members in said housing, and restraining means for preventing, during said alignment of said axes, unrestrained rotation of said members without volumetric changes in said combustion chamber.

10. The rotary device as defined in claim 9 in which said restraining means comprises a stationary gear sector disposed in said cavity, and complementary gear sectors on said nutator arranged to mesh with said stationary gear sector at certain nutator positions, thereby to furnish restraint to said nutator during said alignment of axes where no restraint is provided by the angular relationship of said rotatable members.

11. The rotary device as claimed in claim 9 in which said restraining means comprises a circular eccentric bevel gear disposed in said cavity, and a complementary elliptical bevel gear disposed on the underside of said nutator to mesh therewith.

12. A device in accordance with claim 9 in the form of an engine in which a portion of said nutator and a portion of said other member in conjunction with said housing define a crankcase at a location in said housing remote from said combustion chamber, the volume changes of said crankcase being in opposite phase with the volume changes of said combustion chamber during nutator movement, inlet means for supplying scavenge air to said engine and being disposed in contact with said crankcase so as the volume of said crankcase increases, such air will be drawn therein, to be somewhat compressed during subsequent decrease in crankcase volume, means for supplying such precompressed air to said combustion chamber for scavenging and combustion purposes, so that as the volume of said combustion chamber decreases, such air confined therein becomes highly compressed, fuel introduction means for admitting sufficient fuel into said combustion chamber as to render the mixture of air and fuel combustible, ignition means for igniting the highly compressed charge within the said combustion chamber, the subsequently occurring combustion causing the release of energy in said combustion chamber, thus applying force to a surface of said nutator so as to deliver power.

13. The combination as defined in claim 9 in which said nutator is rotatively mounted upon a crankshaft, said crankshaft being rotatively mounted in said housing with its axis offset from alignment with the axis of rotation of said rotor, said crankshaft bringing about said nutative movements of said nutator.

14. The combination as defined in claim 9 in which said nutator is provided with a load-bearing surface disposed about its periphery, a first substantially circular track disposed about a portion of the interior of said housing, with which said load-bearing surface is in continous contact during rotation of said nutator, an upstanding member substantially centrally disposed with respect to said first track, a second track disposed about the upper surface of said upstanding member, a track-contacting member disposed on a side of said nutator remote from the working surface of said nutator, latter said member being in contact with said second track during rotation of said nutator, said tracks together providing proper nutational motion at all rotative positions of said nutator.

15. A rotary displacement device of the class described comprising a housing having a wall defining in said housing a generally spherical cavity, inlet and outlet means located in substantially opposite portions of said cavity for respectively admitting fluid into and out of said cavity, an interconnected nutator and rotor closely fitted in said cavity and being rotatively disposed in said housing, said nutator and rotor having working surfaces thereon which define with the cavity wall a chamber, said nutator undergoing nutative motion in said housing during rotation with said rotor, thereby to bring about substantially volume changes in said chamber, said inlet means including an inlet port disposed in said wall of said housing, the opening and closing of which is controlled by a portion of said nutator in contact with said cavity wall, said inlet port being opened to provide fluid access to said chamber only during a portion of the nutator movement, thereby controlling the admission of fluid into said chamber, which fluid is compressed by subsequent movement of the working surface of said nutator toward the working surface of said rotor, said rotor controlling the opening and closing of said outlet means and thereby the egress of fluid from said chamber, the period said inlet and outlet portions are opened being overlapped, thereby to provide an essentially straight-through fluid flow path through said chamber during certain rotative positions of said nutator and rotor.

16. A self-scavenged rotary internal combustion engine comprising a housing, said housing having a wall defining a generally spherical cavity, a pair of rotatable members operatively disposed in said cavity and interconnected so as to rotate together, one of said members being a nutator arranged to nutate during rotation, a working surface on each of said members, the working surface of said one member being arranged to closely approach and then move away from the working surface of other of said members as said members rotate in said housing, said working surfaces defining with said wall of said housing a combustion chamber whose volume changes appreciably as said working surfaces move in rotation about said housing, said members each having surfaces substantially opposite from said working surfaces, said opposite surfaces defining with the wall of said chamber a crankcase whose volume changes appreciably during nutative movements of said nutator, and in opposite phase with combustion chamber volume changes, inlet means for admitting combustible mixture to said crankcase during a period of nutator movement in which said crankcase volume is increasing, valve means for preventing reverse flow through said inlet means during a subsequent period of nutator movement in which said crankcase volume is decreasing and crankcase pressure is increasing, port means opened by said nutator for admitting pre-compressed combustible mixture into said combustion chamber from said crankcase, said mixture then being further compressed in said combustion chamber by nutator action prior to ignition, and ignition means for bringing about combustion of said mixture at the time said nutator approaches the position in which combustion chamber volume is at a minimum, thereby to cause power to be delivered to said one member.

References Cited in the file of this patent

UNITED STATES PATENTS

| | | |
|---|---|---|
| 1,135,648 | Ahlm | Apr. 13, 1915 |
| 1,147,428 | Peterson | July 20, 1915 |
| 1,184,650 | Ingraham | May 23, 1916 |
| 1,270,245 | Beard | June 18, 1918 |
| 1,868,130 | Bauer et al. | July 19, 1932 |
| 1,923,500 | Northey | Aug. 22, 1933 |
| 1,968,113 | Weaver | July 31, 1934 |
| 2,040,036 | Weeks | May 5, 1936 |
| 2,297,400 | Friedrich | Sept. 29, 1942 |
| 2,473,785 | Cate | June 21, 1949 |
| 2,476,397 | Bary | July 19, 1949 |
| 2,616,399 | Kohout | Nov. 4, 1952 |
| 2,949,897 | Raybon | Aug. 23, 1960 |
| 2,958,338 | Bachmann | Nov. 1, 1960 |
| 2,969,049 | Dillenberg | Jan. 24, 1961 |

FOREIGN PATENTS

| | | |
|---|---|---|
| 102,180 | Germany | Apr. 4, 1899 |
| 321,935 | Italy | Oct. 22, 1934 |